July 24, 1956 — L. LE R. TOWNSEND — 2,756,116
ADJUSTABLE BEARING
Filed Aug. 24, 1953

INVENTOR
LEON LE ROY TOWNSEND

BY
ATTORNEYS 2,756,116

ADJUSTABLE BEARING

Leon Le Roy Townsend, West Bend, Wis.

Application August 24, 1953, Serial No. 375,989

1 Claim. (Cl. 308—71)

This invention appertains to bearings for rotatably supporting shafts, and more particularly to an adjustable bearing for taking up wear, as the same occurs, between the shaft and the bearing metal.

One of the primary objects of my invention is the provision of a bearing embodying an externally tapered contractible bearing sleeve for receiving the shaft with means for adjusting the sleeve longitudinally in an internally tapered box or the like, the construction being such as to effect a minute adjustment of the sleeve in the box for contracting the sleeve about the shaft to center the shaft and to take up wear.

Another salient object of my invention is to provide means for eliminating the use of split semi-cylindrical bearing members and the difficulties contingent therewith and to substitute therefor a bearing sleeve with means for adjusting and contracting the sleeve in its box or the like.

A further object of my invention is to provide an outer sleeve of hard metal having an internal taper fitted in the bearing box or the like, and an inner bearing sleeve for the shaft having an external taper, the bearing sleeve also having longitudinally extending slots for permitting the contraction thereof, with nuts threaded on the opposite ends of the bearing sleeve for engaging the outer sleeve or box for effecting a micrometer adjustment of the bearing sleeve in the outer internally tapered supporting sleeve.

A still further object of my invention is the provision of means for preventing rotation of the inner and outer sleeves relative to one another and to the bearing box or the like.

A still further important object of my invention is to provide a bearing of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described and claimed and illustrated in the accompanying drawing, in which drawing:

Figure 1:
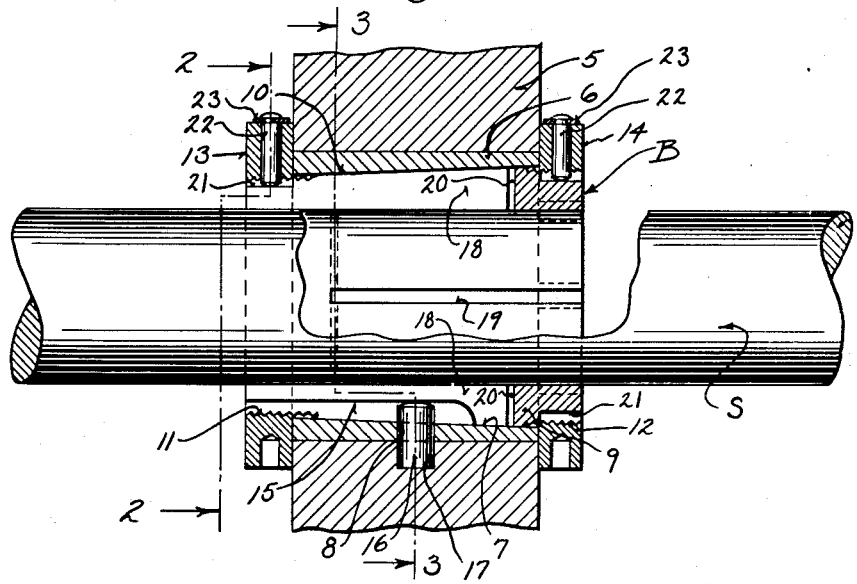
Figure 1 is a longitudinal sectional view through my improved bearing, the section being taken on the line 1—1 of Figure 2, looking in the direction of the arrows.
Figure 2:
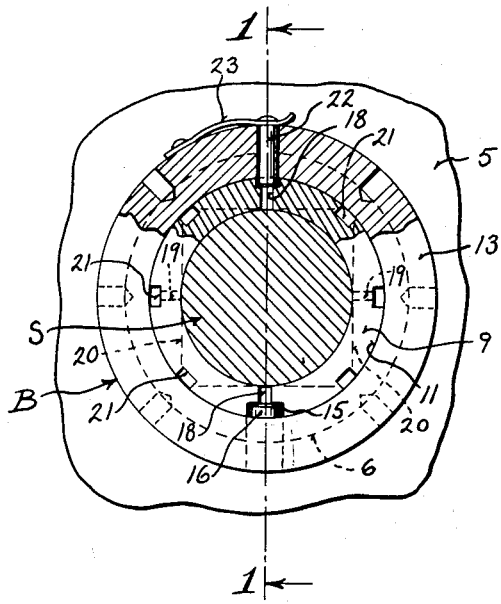
Figure 2 is a transverse sectional view taken on the line 2—2 of Figure 1, looking in the direction of the arrows and illustrating more particularly one means for holding the adjusting nuts against rotation and in a set adjusted position.
Figure 3:
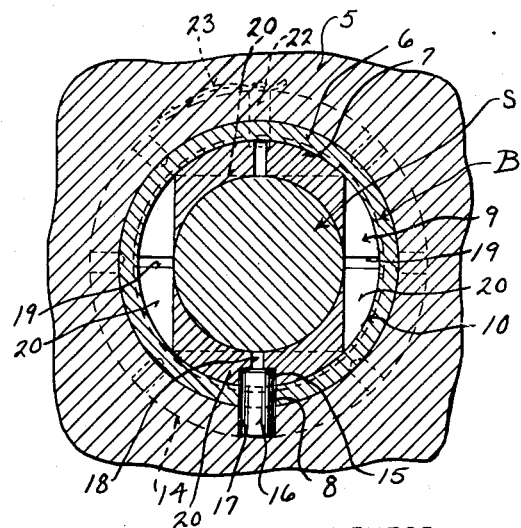
Figure 3 is a transverse sectional view through the bearing taken on the line 3—3 of Figure 1, looking in the direction of the arrows, illustrating the arrangement of the slots in the inner bearing sleeve and the means for holding the inner and outer sleeves against rotation.

Referring to the drawing in detail, wherein similar reference characters designate corresponding parts throughout the several views, the letter B generally indicates my improved bearing which can be mounted in a bearing box or the like 5. The preferred form of my bearing B can include an outer cylindrical sleeve 6 formed of hard metal, such as steel, and this sleeve is provided with an internal taper 7 which extends from one end of the sleeve to the other, and intermediate its ends this sleeve has formed therein an opening 8, the purpose of which will later appear.

Slidably mounted within the outer sleeve 6 is the novel inner bearing sleeve 9 formed of a desired bearing metal, such as bronze or brass. This inner bearing sleeve 9, is provided with an external taper 10 and this taper extends opposite to the internal taper of the outer sleeve 6, whereby the inner bearing sleeve 9 will fit snug within the outer sleeve. The inner bearing surface of the inner sleeve 9 can be honed to the desired smooth finish, if so preferred, to rotatably receive a shaft S. The opposite ends of the inner bearing sleeve 9 are provided respectively with external threads 11 and 12 on which are threaded adjusting nuts 13 and 14. These nuts are adapted to bear against the opposite ends of the outer sleeve 6. The outer surface of the inner sleeve is provided with a longitudinal way 15 which opens out through one end of the sleeve and in order to hold the inner and outer sleeves against turning movement in the box 5, a pin 16 is fitted in a socket 17 in the box and through the opening 8 in the outer sleeve and into the way 15. In assembling the sleeves, the outer sleeve 6 is first inserted in the box, after which the pin 16 is placed through the opening 8 and into the socket 17, after which the inner sleeve 9 is slid into the outer sleeve with the pin 16 in the way 15.

As heretofore brought out, the inner sleeve is of a special construction and extending inwardly from one end are diametrically opposed slots 18 and extending inwardly from the opposite end are similarly diametrically opposed slots 19. The slots 18 and 19 terminate respectively short of the opposite ends of the inner sleeves and kerfs 20 can be cut into the inner sleeve at the terminals of these slots. The slots 18 and 19 provide means, whereby the inner sleeve can be contracted, as will be later brought out. If preferred, these slots can terminate short of both ends of the sleeve and in which instance the kerfs 20 are formed at each end of each slot.

In operation of my bearing, the same is assembled, as previously described, and as wear occurs, the nuts 13 and 14 can be adjusted so as to slide the inner bearing sleeve in or out of the outer sleeve 6, as the case may be. As the inner sleeve is slid in the outer sleeve under the adjustment of the nuts, the inner sleeve can be contracted to an exact desired amount, and obviously, the nuts 13 and 14 permit this minute adjustment.

In some cases, it might be desirable to lock the nuts 13 and 14 in a set adjusted position against accidental movement, and in this instance means can be provided for preventing such accidental turning. In the drawing, I have illustrated one way of accomplishing this and the means illustrated can include a plurality of equidistantly spaced peripheral notches 21 in the ends of the inner sleeve 9. The nuts 13 and 14 can slidably carry lock pins 22 for fitting in selected notches. Leaf springs 23 can be provided for normally urging the pins 22 into a locking position.

While I have shown the use of an outer sleeve 6, it is to be understood that in case of line shafting and the like the inner surface of a pillar block can be internally tapered to receive the inner sleeve.

My bearing is particularly useful in replacing split type bearings for the main shafts in lathes, and my bearing is self-centering and can be minutely adjusted without the necessity of employing a scraper or the like. The bearing is easily assembled and inexpensive to manufacture. The bearing with its fine adjustment reduces chatter to a minimum.

Changes in details may be made without departing from the spirit or the scope of my invention, but what I claim as new is:

An adjustable bearing comprising a bearing box, an outer supporting sleeve formed from hard metal fitted within the box and said sleeve having an internal taper, an inner sleeve formed from bearing metal having an external taper slidably fitted within the outer sleeve, the terminals of the inner sleeve extending beyond the outer ends of the outer sleeve and being externally threaded, said inner sleeve having a pair of diametrically opposed slots extending inwardly from one end only and another pair of diametrically opposed slots spaced from said first pair and extending inwardly from the other end only, said inner sleeve having a longitudinal way, a dowel pin fitted in the box and extending through said outer sleeve and into said way, nuts fitted on the outer ends of the inner sleeve against the opposite ends of the outer sleeve, and means for holding said nuts against accidental turning movement after adjustment.

References Cited in the file of this patent

UNITED STATES PATENTS

| | | |
|---|---|---|
| 296,703 | Mitchell | Apr. 8, 1884 |
| 1,171,105 | Deuchler | Feb. 8, 1916 |
| 1,408,837 | Sobolewski | Mar. 7, 1922 |
| 2,372,888 | Duggan | Apr. 3, 1945 |

FOREIGN PATENTS

| | | |
|---|---|---|
| 745,554 | France | May 12, 1933 |